United States Patent [19]

Morikawa et al.

[11] Patent Number: 4,843,405

[45] Date of Patent: Jun. 27, 1989

[54] METHOD OF CONTROLLING REPRODUCTION OF IMAGE IN BIT-MAP CONTROLLED LASER PRINTER

[75] Inventors: Takashi Morikawa; Yoshikazu Ikenoue, both of Osaka, Japan

[73] Assignee: Minolta Camera Kabushiki Kaisha, Osaka, Japan

[21] Appl. No.: 204,717

[22] Filed: Jun. 10, 1988

[30] Foreign Application Priority Data

Jun. 12, 1987 [JP] Japan .................................. 62-147606

[51] Int. Cl.$^4$ .......................... G01D 9/00; G01D 9/42; G06F 15/626
[52] U.S. Cl. ..................................... 346/1.1; 346/108; 364/521; 358/296
[58] Field of Search ........................ 346/1.1, 108, 160; 358/296, 300, 302; 364/521

[56] References Cited

U.S. PATENT DOCUMENTS

| | | |
|---|---|---|
| 4,168,488 | 9/1979 | Evans . |
| 4,627,020 | 12/1986 | Anderson et al. . |
| 4,701,863 | 10/1987 | Bruce .................................... 364/521 |
| 4,716,544 | 12/1987 | Bartley . |
| 4,782,462 | 11/1988 | Kaplinsky ........................... 364/521 |

Primary Examiner—E. A. Goldberg
Assistant Examiner—Mark Reinhart
Attorney, Agent, or Firm—Burns, Doane, Swecker & Mathis

[57] ABSTRACT

In a printer apparatus wherein information relating to character patterns to be printed is received from an external source and is analyzed and converted into intermediate coded data, which are stored into a temporary memory and are thereafter successively read from the temporary memory to produce bit-map image data representative of the character patterns to be printed for each page of printed output, whereupon the bit-map image data is stored into a bit-map memory by referring to a font memory and the character patterns are printed on the basis of the bit-map image data read from the bit-map memory for each page of printed output, a method of conveniently converting the information received from the external source into the intermediate coded data, storing the intermediate coded data into the temporary memory and thereafter storing bit-map image data into the bit-map memory in accordance with the intermediate coded data read from the temporary memory. The information received from the external source is converted into the intermediate coded data preferably such that the intermediate coded data is particularly useful for having the character patterns printed in any desired orientations or attitudes on a print sheet.

2 Claims, 16 Drawing Sheets (XG-YG: LANDSCAPE)

(XG-YG: PORTRAIT)

$\theta = 0°$ $\theta = 90°$ $\theta = 180°$ $\theta = 270°$

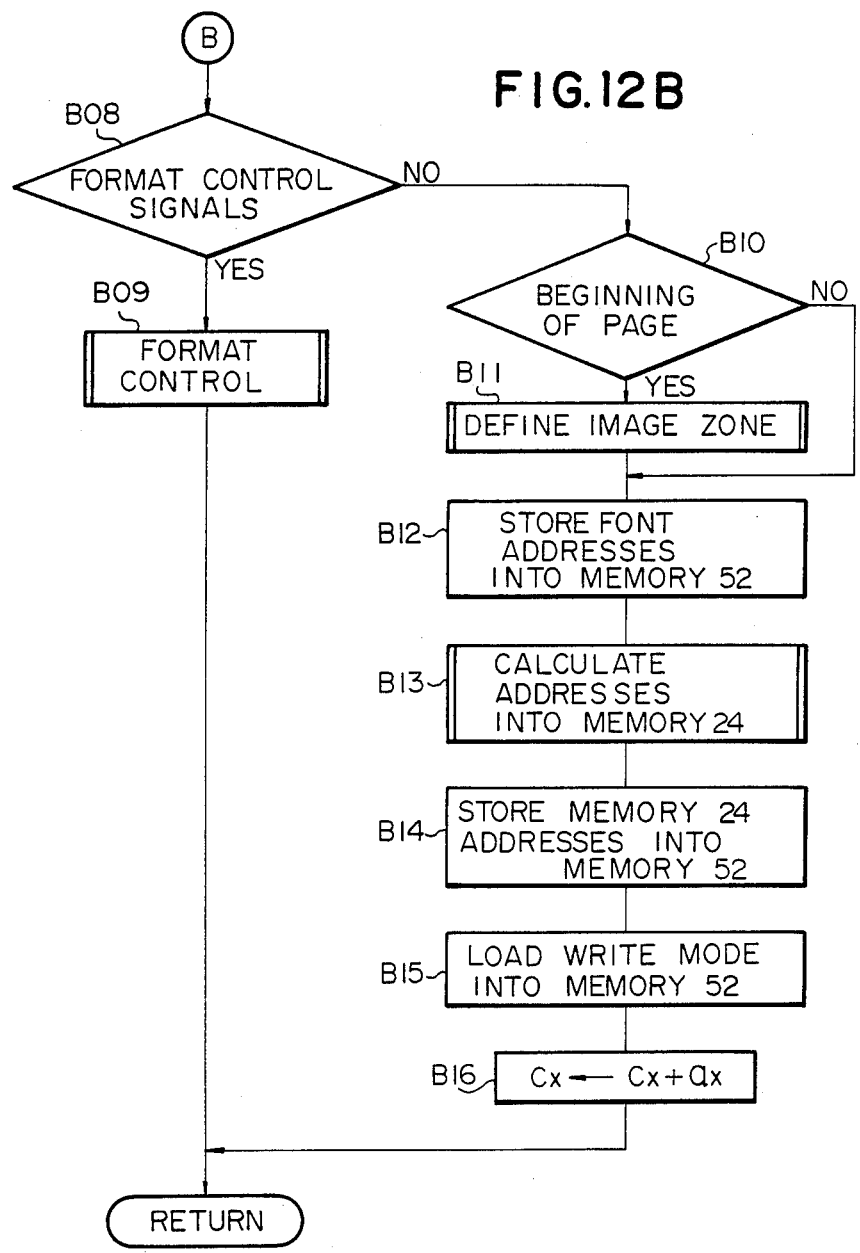

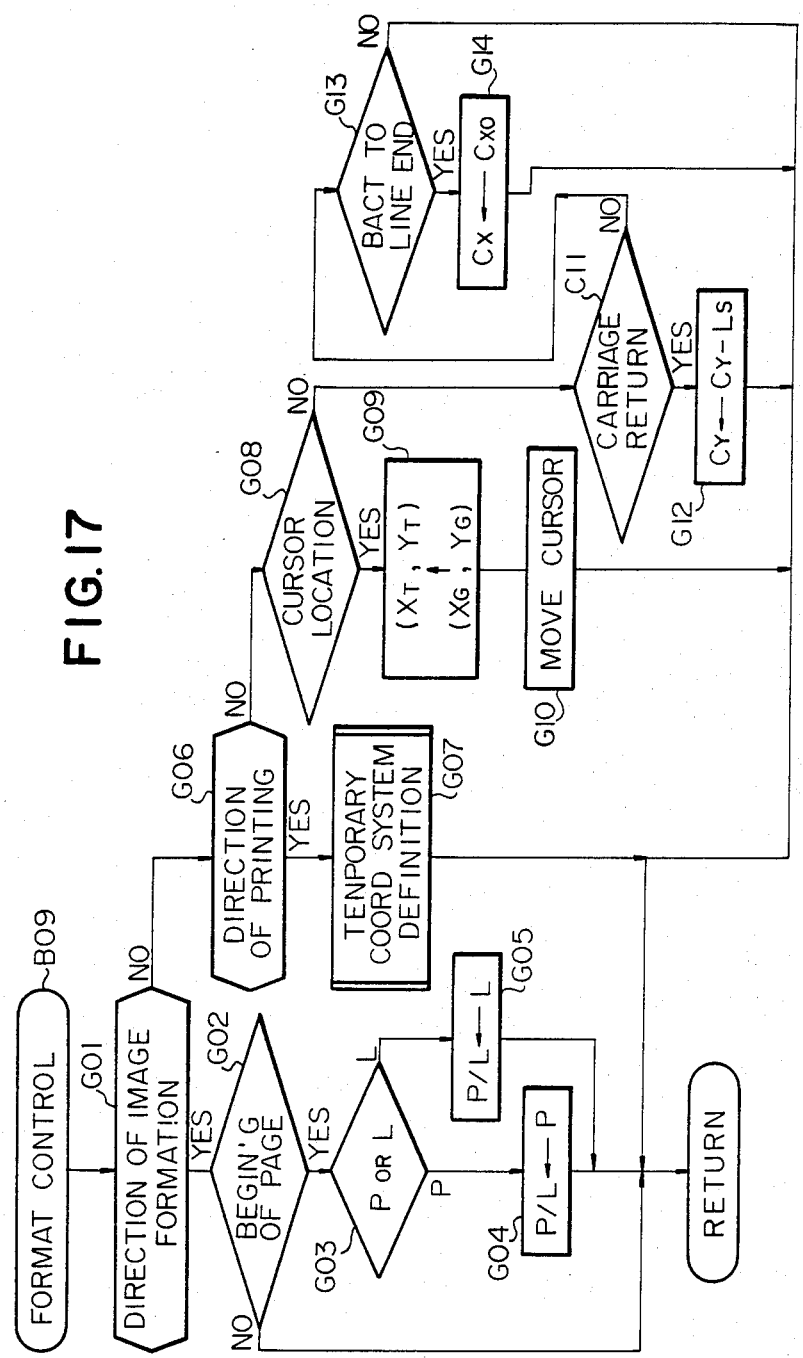

METHOD OF CONTROLLING REPRODUCTION OF IMAGE IN BIT-MAP CONTROLLED LASER PRINTER

FIELD OF THE INVENTION

The present invention relates to a printer apparatus of the bit-map controlled laser printer type In a printer apparatus of this type, information relating to character patterns to be printed is received from an external source and is analyzed and converted into intermediate coded data. The intermediate coded data are stored into a temporary memory and are thereafter successively read from the temporary memory to produce bit-map image data representative of the character patterns to be printed for each page of printed output. The bit-map image data is then stored into a bit-map memory by referring to a font memory whereupon the character patterns are printed on the basis of the bit-map image data read from the bit-map memory for each page of printed output.

More specifically, the present invention relates to a method of converting the information received from the external source into the intermediate coded data and storing the intermediate coded data into the temporary memory. The present invention further relates to a method of converting the information received from the external source into the intermediate coded data such that the intermediate coded data is particularly useful for having the character patterns printed in any desired orientations or attitudes on a print sheet.

BACKGROUND OF THE INVENTION

Various types of printers are known and used as standard output modules of computer systems. Among such printers is a printer apparatus of the bit-map controlled laser printer type which is now finding a growing range of practical applications as the output units of various data processing and computer graphics systems. This is because of the high-speed high-resolution printing capabilities and the ease of graphic data processing as can be achieved in a printer apparatus of the bit-map controlled laser printer type.

A laser printer has incorporated therein a character generator including a bit-map memory in addition to an ordinary font memory and has stored in the bit-map memory a collection of data required for the reproduction of images or character patterns for each page of printed output. The data thus stored in the bit-map memory are successively read out from the memory and are processed to produce digital signals carrying the graphic or character pattern data to be reproduced. A laser beam modulated with these digital signals is directed onto the peripheral surface of a photosensitive drum to produce thereon latent images corresponding to the graphic or character pattern data. These latent images are developed into visible toner images on the surface of the drum, from which the toner images are transferred to the surface of a print sheet When an engineering drawing, a graphic representation of numerical data or a table of values is to be printed on a print sheet, it is frequently required to have character patterns printed in orientations or attitudes which differ from one character pattern or from one set of character patterns to another. Where there is such a requirement, one may use a word processor to enter the differently oriented character patterns and edit the image area while consulting the images of the character patterns indicated on the display screen. From the host computer of the word processor is thus supplied image and control data signals for the reproduction of the image containing the differently oriented character patterns. The laser type printer used for the word processor receives these image and control data signals to print the character patterns in the designated orientations as well as the graphic features on the surface of a print sheet in accordance with the signals received.

The signals to form differently oriented character patterns may be produced with use of a plurality of font memories having different character pattern orientations, respectively. The use of such a plurality of font memories is however not practically advisable because of the production cost required for the provision of the memories. A presently accepted approach is therefore to use a single front memory and transform the coordinate system of the data read from the memory into a coordinate system producing an angularly shifted version of the image represented by the data. The data read from the font memory are stored into the bit-map memory in the character generator of the printer at addresses designated for the transformation of the coordinate system of the character pattern data. Character pattern data representative of an angularly shifted version of the character pattern data is then read from the bit-map memory and the angularly shifted character patterns are then printed on the basis of the data thus read out from the bit-map memory.

This kind of approach however has problems encountered in formulaing the protocol between the printer and the host computer and in the management of the addresses in the bit-map memory.

SUMMARY OF THE INVENTION

It is, accordingly, an important object of the present invention to provide a useful method of conveniently converting the information received from an external source into intermediate coded data, storing the intermediate coded data into a temporary memory and thereafter storing bit-map image data into a bit-map memory in accordance with the intermediate coded data read from the temporary memory.

It is another important object of the present invention to provide a method of converting the information received from the external source into the intermediate coded data such that the intermediate coded data is particularly useful for having the character patterns printed in any desired orientations or attitudes on a print sheet In accordance with the present invention, there is provided in a printer apparatus wherein information relating to character patterns to be printed is received from an external source and is analyzed and converted into intermediate coded data, which are stored into a temporary memory and are thereafter successively read from the temporary memory to produce bit-map image data representative of the character patterns to be printed for each page of printed output, whereupon the bit-map image data is stored into a bit-map memory by referring to a font memory and the character patterns are printed on the basis of the bit-map image data read from the bit-map memory for each page of printed output, a method of converting the information received from the external source into the intermediate coded data and storing the intermediate coded data into the temporary memory, comprising (a) a step of initially producing a parameter indicating the direction of printing in which character patterns are to be printed along a line, the parameter being given in terms of an angular shift from a predetermined direction of printing, (b) a step of analyzing the information received from the external source to determine whether or not the direction of printing designated by the information received is identical with the direction of printing indicated by the aforesaid parameter, (c) a step of updating the parameter if the direction of printing designated by the information received is not identical with the direction of printing indicated by the previously set parameter, (d) a step through which a coordinate value representative of a particular location at which the printing of a character pattern is to be started is transformed from one coordinate system into another on the basis of the updated parameter such that the coordinate value corresponds to a coordinate value in the coordinate system on the bit-map memory, and (e) a step of storing the updated parameter and the transformed coordinate value into the temporary memory, (f) the steps (b), (c) and (d) being executed in respect to the information relating to each of the character patterns whereby the intermediate coded data for all of the character patterns are stored into the temporary memory to store the bit-map image data for each of the character patterns into the bit-map memory.

In this method according to the present invention, the initial parameter is produced preferably by (a-1) a step of analyzing data relating to the orientations in any of which a print sheet may be fed in the printer apparatus and data relating to a standard direction in which character patterns are to be printed along a line, and (a-2) a step of determining the initial direction of printing in which character patterns are to be printed along a line and thereafter producing the initial parameter indicating the initial direction of printing.

BRIEF DESCRIPTION OF THE DRAWINGS

The features and advantages of a method according to the present invention will be more clearly appreciated from the following description taken in conjunction with the accompanying drawings in which:

FIGS. 12A and 12B are flowcharts showing the details of a data analysis/processing subroutine program included in the main routine program illustrated in FIGS. 11A, 11B and 11C;

FIG. 17 is a flowchart showing the details of a format control subroutine program included in the data analysis/ processing subroutine program illustrated in FIG. 12.

DESCRIPTION OF THE PREFERRED EMBODIMENT

Description will be hereinafter made in respect of a method according to the present invention as applied to the character generator of a laser printer apparatus. For better understanding of the novel aspect of an embodiment of the present invention, the basic concepts of some coordinate systems used in character pattern data storage memories of character generators in general will be first briefly reviewed with reference to the drawings.

Figure 1:
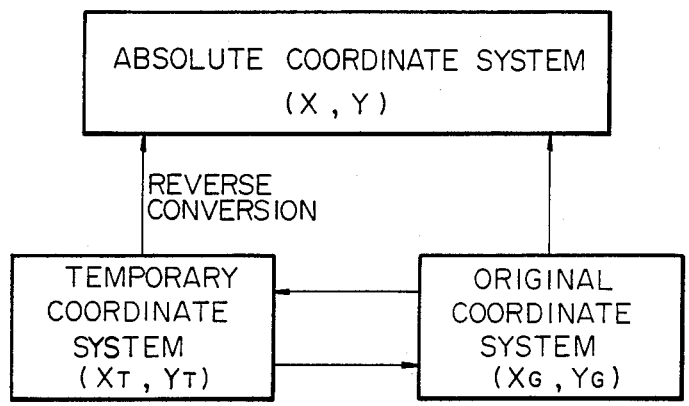
FIG. 1 is a block diagram schematically showing the general relationship among the absolute, original and temporary coordinate systems used in a printer apparatus carrying out a method according to the present invention.

In a method according to the present invention, there are used three different coordinate systems which consist of an absolute coordinate system, an original coordinate system and a temporary coordinate system. FIG. 1 shows the general relationship among these three coordinate systems wherein each of the arrows indicates that the coordinate system in which the arrow originates can be transformed into the coordinate system to which the arrow is directed. Each of these three coordinate systems is organized in the form of an orthogonal coordinate system defined by x- and y- axes which are, for convenience sake, herein represented by X and Y for the absolute coordinate system, $X_G$ and $Y_G$ for the original coordinate system, and $X_T$ and $Y_T$ for the temporary coordinate system, as shown.

Figure 2A:
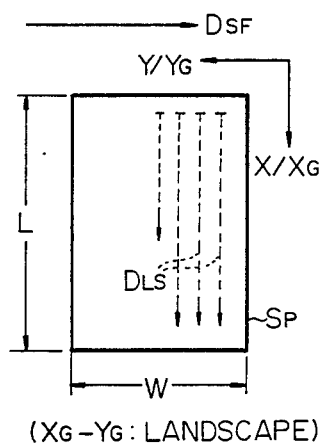
FIGS. 2A and 2B are schematic views each showing the absolute or original coordinate system defined with respect to the direction in which the print sheet is to be fed through the print unit of the printer apparatus carrying out a method according to the present/invention.
Figure 2B:
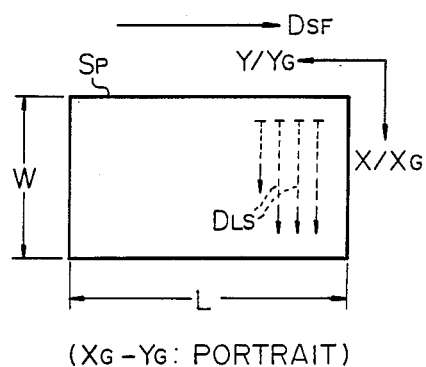

The absolute X-Y coordinate system has coordinate locations respectively corresponding to the addresses of the character pattern data stored in the x-y matrix of a character pattern data storage memory. The correspondence between such coordinate locations of the absolute X-Y coordinate system and the address locations of the character pattern data storage memory is maintained by the hardware connections between the character pattern data storage memory and the print unit (not shown) of the printer apparatus. As shown in FIGS. 2A and 2B, the X-axis direction in this absolute X-Y coordinate system is defined to be parallel with the directions $D_{LS}$ in which the laser beam is to sweep the surface of a print sheet $S_P$. The Y-axis direction of the system is defined to be the direction which is angularly shifted clockwise through 90 degrees from the X-axis direction, viz., the direction opposite to the direction $D_{SF}$ in which the print sheet $S_P$ is to be fed through the print unit. The absolute X-Y coordinate system is thus defined definitely when the direction $D_{SF}$ in which the print sheet $S_P$ is to be fed through the print unit is specified for the print sheet $S_P$ on which the character patterns read from the character pattern data storage memory are to be printed. When the print sheet $S_P$ is oriented for "lateral feed" with its width or shorter measurement W in the direction $D_{SF}$ of travel of the print sheet $S_P$ as shown in FIG. 2A, the X-axis direction of the absolute X-Y coordinate system is defined as the sense directed rightwardly along the length or longer measurement L of the print sheet $S_P$ and the Y-axis direction defined as the sense directed downwardly along the shorter measurement W of the print sheet $S_P$ when the print sheet $S_P$ is viewed with its longer measurement L on the horizontal. When the print sheet $S_P$ is oriented for "longitudinal feed" with its longer measurement L in the direction $D_{PS}$ of travel of the print sheet $S_P$ as shown in FIG. 2B, the X-axis direction of the absolute X-Y coordinate system is defined as the sense directed rightwardly along the shorter measurement W of the print sheet $S_P$ and the Y-axis direction is defined as the sense directed downwardly along the longer measurement L of the print sheet $S_P$ when the print sheet $S_P$ is viewed with its shorter measurement W on the horizontal.

The original $X_G$-$Y_G$ coordinate system has coordinate locations having respectively corresponding character pattern elements, or pixels, of the character patterns to be printed on the print sheet $S_p$ as viewed by the operator of the printer apparatus, viz., the operator desiring to have the character patterns printed on the print sheet $S_P$. This original $X_G$-$Y_G$ coordinate system is coincident with an ordinary orthogonal x-y coordinate system taken on a print sheet and, thus, the image elements or pixels to form a given character pattern are defined in this original $X_G$-$Y_G$ coordinate system without respect to the orientation or attitude of the character pattern actually printed on the print sheet.

In this original $X_G$-$Y_G$ coordinate system, the $X_G$-axis direction is defined as the sense directed rightwardly along the shorter measurement W of the print sheet $S_P$ and the $Y_G$-axis direction defined as the sense directed downwardly along the longer measurement L of the print sheet $S_P$ for the direction of printing $D_{LS}$ in a "portrait" print mode in which character patterns are to be printed in lines parallel with the shorter measurement W of the print sheet $S_P$. For the direction of printing $D_{LS}$ in a "landscape" print mode in which character patterns are to be printed in lines parallel with the longer measurement L of the print sheet $S_P$, the $X_G$-axis direction in the original $X_G$-$Y_G$ coordinate system is defined as the sense directed rightwardly along the longer measurement L of the print sheet $S_P$ and the $Y_G$-axis direction defined as the sense directed downwardly along the shorter measurement W of the print sheet $S_P$. Thus, the original $X_G$-$Y_G$ coordinate system is coincident with the absolute X-Y coordinate system for a print sheet oriented for lateral feed when the landscape mode of printing is used as shown in FIG. 2A and with the absolute X-Y coordinate system for a print sheet oriented for longitudinal feed when the portrait mode of printing is used as shown in FIG. 2B.

Whether the portrait mode of printing is to be used or the landscape mode of printing is to be used is determined by the operator entering instructions into the host computer from which character pattern data are to be loaded into the printer apparatus. A print mode flag of a logic "0" or "1" state is produced depending on the operator's choice between the portrait and landscape modes of printing. The printer apparatus then selects either the portrait mode of printing or the landscape mode of printing depending on the logic state of the print mode flag which is located at the beginning of the sequence of data supplied from the host computer for each of the pages to be printed.

The temporary $X_T$-$Y_T$ coordinate system has coordinate locations which define the respective locations of the character pattern elements or pixels to be printed on the print sheet $S_P$ as viewed by the operator of the printer apparatus. While the coordinate locations defined by each of the absolute and original $X_G$-$Y_G$ coordinate systems are given without respect to the orientation of a character pattern to be actually printed and viewed by the operator of the apparatus, the coordinate locations defined in this temporary $X_T$-$Y_T$ coordinate system dictate those orientations or attitudes of character patterns which may vary from one character pattern to another within each of the pages to be printed. The temporary $X_T$-$Y_T$ coordinate system defines the orientations of the individual character patterns to be printed for each page in terms of the angular shifts of the character patterns from the standard orientations or attitudes in the original $X_G$-$Y_G$ coordinate system. In this temporary $X_T$-$Y_T$ coordinate system, the $X_T$-axis direction corresponds to the direction of movement of the cursor on the display screen and is defined as the direction in which a character pattern which may be shifted or turned through any angle from the standard orientation in the original $X_G$-$Y_G$ coordinate system is to be formed from the left to the right of the character pattern when the character pattern is viewed in its standard orientation. In other words, the $X_T$-axis direction of the temporary $X_T$-$Y_T$ coordinate system is the direction in which a line composed of a series of character patterns which may be angularly shifted or turned through any angle from the standard orientation for viewing is to be formed from the left to the right of the line when the line is assumed to extend horizontally. Thus, the $Y_T$-axis direction of the temporary $X_T$-$Y_T$ coordinate system is defined as the direction which is clockwise turned through 90 degrees from the $X_T$-axis direction or, in other words, the direction in which a line space is to follow the line composed of the series of character patterns which may be shifted or turned from the standard orientation in the original $X_G$-$Y_G$ coordinate system.

In a method according to the present invention, the term "direction of printing" as used for a letter or character pattern refers to an "imaginary" direction which is to be determined depending on the orientation of the character pattern which may be shifted or turned through any angle from the standard orientation or attitude for viewing. Such an "imaginary" direction of printing is distinguished from the "actual" direction $D_{LS}$ of printing in which character pattern elements are to be printed on a print sheet by means of the laser beam sweeping the surface of the print sheet in the X-axis direction of the absolute X-Y coordinate system These "imaginary" and "actual" directions of printing may be coincident in some cases or ma differ from each other in other cases.

Figure 3A:
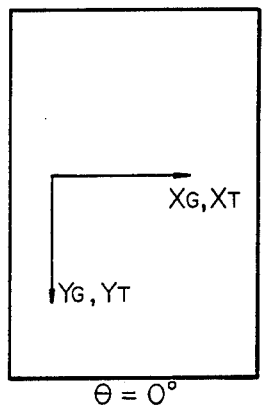
FIGS. 3A, 3B, 3C and 3D are schematic views showing show how the original coordinate system is to be transformed into the temporary coordinate system or vice verse when the portrait mode of printing is used for the original coordinate system and a character pattern is shifted through different angles from the standard orientation.
Figure 3B:
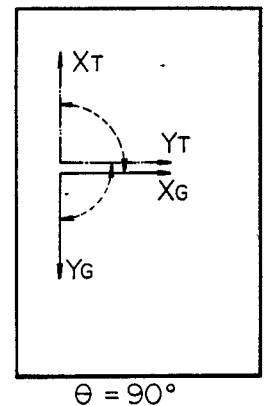
Figure 3C:
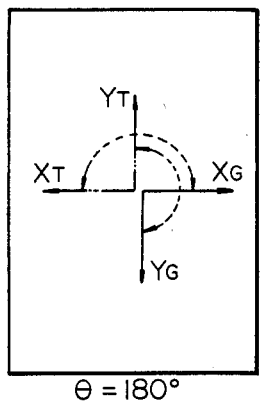
Figure 3D:
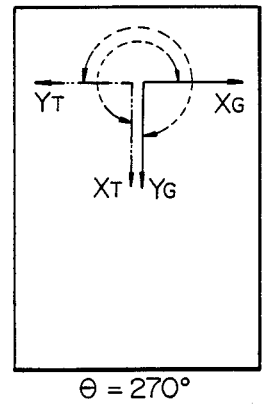

FIGS. 3A to 3D show how the original $X_G$-$Y_G$ coordinate system is to be transformed into the temporary $X_T$-$Y_T$ coordinate system or vice versa when the portrait mode of printing is used with a character pattern angularly shifted through different angles $\theta$ from the standard orientation. FIG. 3A shows the transformation between the original $X_G$-$Y_G$ coordinate system and the temporary $X_T$-$Y_T$ coordinate system for a character pattern angularly shifted through zero degrees from the standard orientation, the two coordinate systems being in this instance exactly identical with each other. FIGS. 3B, 3C and 3D show the transformation between the original $X_G$-$Y_G$ coordinate system and the temporary $X_T$-$Y_T$ coordinate system for a character pattern angularly shifted through the angles $\theta$ of 90 degrees, 180 degrees and 270 degrees, respectively, from the standard orientation.

As well known in the art, an xy-coordinate system can be transformed into an x'y'-coordinate system in accordance with equations $$x' = a_{11}x + a_{12}y + a_{13}x_{max} + a_{14}y_{max} \quad \text{Eq. 1}$$

$$y' = a_{21}x + a_{22}y + a_{23}x_{max} + a_{24}y_{max} \quad \text{Eq. 2}$$

These equations can be expressed in the form of the matrix $$\begin{vmatrix} x' \\ y' \end{vmatrix} = \begin{vmatrix} a_{11} a_{12} a_{13} a_{14} \\ a_{21} a_{22} a_{23} a_{24} \end{vmatrix} \begin{vmatrix} x \\ y \\ x_{max} \\ y_{max} \end{vmatrix} \quad \text{Eq. 3}$$

The following table demonstrates the matrices $A_\theta$ for the transformation from the original $X_G$-$Y_G$ coordinate system into the temporary $X_T$-$Y_T$ coordinate system and the transformation from the temporary $X_T$-$Y_T$ coordinate system into the original $X_G$-$Y_G$ coordinate system and further from the original $X_G$-$Y_G$ coordinate system into the absolute X-Y coordinate system for angular shifts through the angles $\theta$ of 0, 90, 190 and 270 degrees.

| From $X_G$-$Y_G$ to $X_T$-$Y_T$ | From $X_T$-$Y_T$ to $X_G$-$Y_G$, and from $X_G$-$Y_G$ to X-Y | Transformation Matrix ($A_\theta$) | | | |
|---|---|---|---|---|---|
| $\theta = 0°$ | $\theta = 0°$ | $A_0 =$ | 1 0 0 0 | | |
|  |  |  | 0 1 0 0 | | |
| $\theta = 90°$ | $\theta = 270°$ | $A_{90} =$ | 0 −1 0 1 | | |
|  |  |  | 1 0 0 0 | | |
| $\theta = 180°$ | $\theta = 180°$ | $A_{180} =$ | −1 0 1 0 | | |
|  |  |  | 0 −1 0 1 | | |
| $\theta = 270°$ | $\theta = 90°$ | $A_{270} =$ | 0 1 0 0 | | |
|  |  |  | −1 0 1 0 | | |

Figure 4:
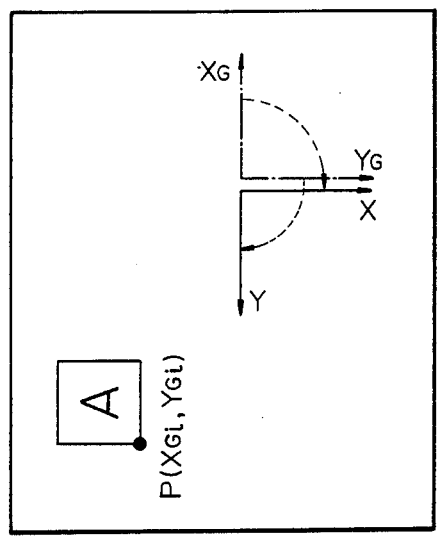
FIG. 4 is a schematic view showing how the original coordinate system is to be transformed into the absolute coordinate system in the printer apparatus carrying out a method according to the present invention.

FIG. 4 shows how the original $X_G$-$Y_G$ coordinate system is to be transformed into the absolute X-Y coordinate system when the print sheet $S_P$ is oriented for longitudinal feed with the landscape mode of printing used and with a character pattern in the temporary $X_G$-$Y_G$ coordinate system shifted through the angle $\theta$ of zero degrees from the standard orientation in the original $X_G$-$Y_G$ coordinate system. As will be apparent from FIG. 4, the original $X_G$-$Y_G$ coordinate system has an angular shift of 90 degrees from the absolute X-Y coordinate system such that the $X_{Gi}$ and $Y_{Gi}$ coordinates at a given point $P(X_{Gi}, Y_{Gi})$ on the original $X_G$-$Y_G$ coordinate system are expressed on the absolute X-Y coordinate system by the $X_i$ and $Y_i$ coordinates as $$X_i = Y_{Gi}, \text{ and}$$

$$Y_i = X_{Gmax} - X_{Gi}.$$

Figure 5:
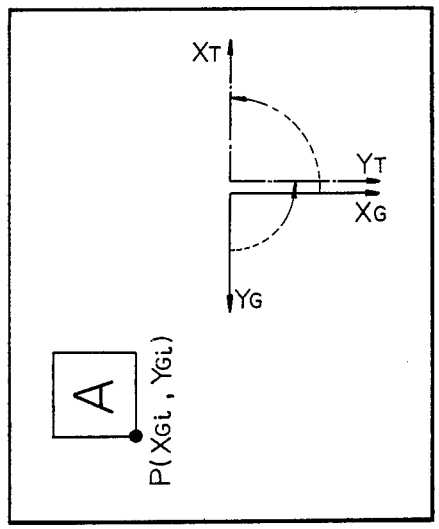
FIG. 5 is a schematic view showing how the original coordinate system is to be transformed into the temporary coordinate system in the printer apparatus carrying out a method according to the present invention.

FIG. 5 shows how the original $X_G$-$Y_G$ coordinate system is to be transformed into the temporary $X_T$-$Y_T$ coordinate system when the portrait mode of printing is used with a character pattern in the temporary $X_T$-$Y_T$ coordinate system angularly shifted through the angle $\theta$ of 90 degrees from the standard orientation in the original $X_G$-$Y_G$ coordinate system. In this instance, the $X_{Gi}$ and $Y_{Gi}$ coordinates at a given point $P(X_{Gi}, Y_{Gi})$ on the original $X_G$-$Y_G$ coordinate system are expressed on the temporary $X_T$-$Y_T$ coordinate system by the $X_{Ti}$ and $Y_{Ti}$ coordinates as $$X_{Ti} = Y_{Gmax} - Y_{Gi}, \text{ and } Y_{Ti} = X_{Gi}.$$

Figure 6:
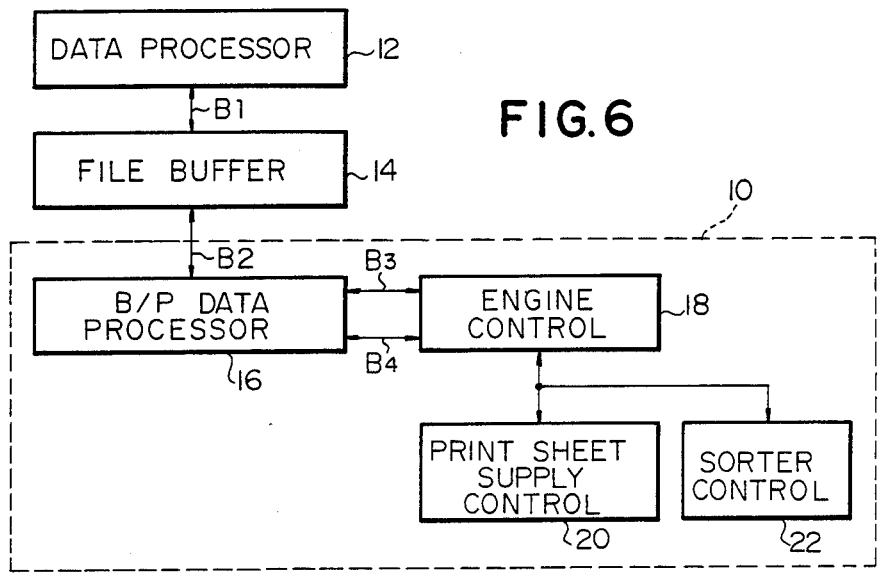
FIG. 6 is a block diagram showing the general arrangement of a control system which forms part of the printer apparatus carrying out a method according to the present invention as connected to a standard data processor unit.

FIG. 6 shows the general arrangement of a control system which forms part of the printer apparatus in which a method according to the present invention may be used. The printer apparatus is assumed to be of the bit-map controlled laser printer type and, though not shown in the drawings, largely consists of a print engine module which may be implemented by a known electrophotographic image reproducing system provided with a sheet supply module and a print output module. The sheet supply module implements a record medium supply unit similar to that used in an ordinary image duplicating apparatus, and the print output module may be implemented by a printed output sorter. The sheet supply module implementing the record medium supply unit may be be of the type using detachable paper storage cassettes. The bit-map controlled laser printer thus composed of the print engine module, sheet supply module and print output module has provided on the print engine module a control panel arranged with various keys, indicators and display sections.

The printer apparatus thus constructed and arranged generally further comprises a control system 10 which is coupled to a standard-type host data processor unit 12 preferably through a file buffer circuit 14 by way of buses B1 and B2. From the host data processor unit 12 herein used is to be supplied data including those representative of the character patterns to be printed and those representative of the control procedures in accordance with which the character patterns are to be printed. Such character pattern an control data are output from the host data processor unit 12 in accordance with prescribed rules and formats which form a particular communications protocol.

The data supplied from the host data processor unit 12 through the bus B1 is once stored in the file buffer circuit 14 and is thereafter supplied through the bus B2 a bit-map data processing network 16 which forms part of the control system 10. The control system 10 comprises, in addition to the data processing network 16, a print engine control network 18 which communicates with the bit-map data processing network 16 by way of a control data bus B3 or through a character pattern data bus B4 as shown. The print engine control network 18 in turn is connected to a print supply control circuit 20 to control the print sheet supply unit implementing the sheet supply module, and a sorter control circuit 22 to control a printed output sorter which is implemented by the print output module of the printer apparatus embodying the present invention. The detailed arrangements of preferred examples of the bit-map data processing network 16 and print engine control network 18 are depicted in FIG. 7.

Figure 7:
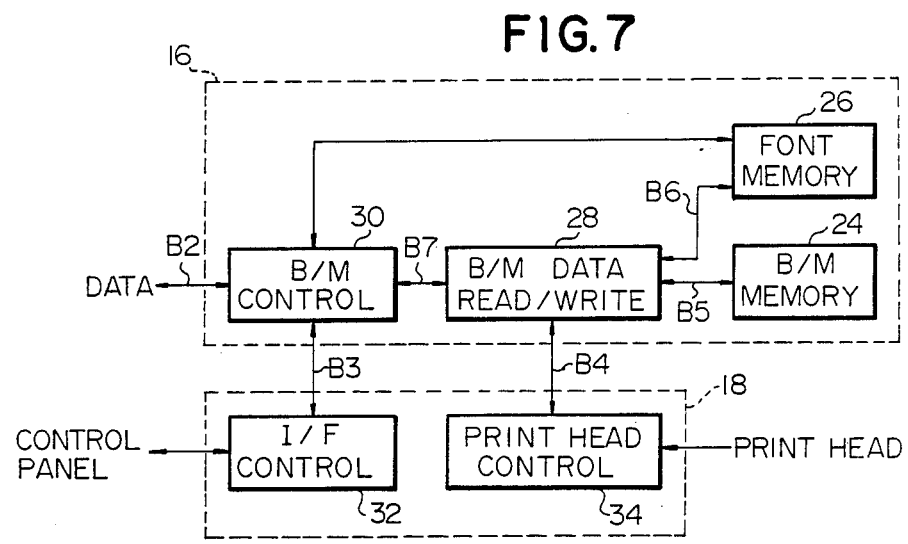
FIG. 7 is a block diagram showing the detailed configurations of bit-map data processing and print engine control networks incorporated in the control system illustrated in FIG. 6.

Referring to FIG. 7, the bit-map data processing network 16 comprises memory means including a bit-map memory unit 24 typically implemented by a random-access memory (RAM) for storing character pattern information, and a font memory unit 26 which has a collection of alphanumerical font data fixedly stored therein. The bit-map data processing network 16 further comprises a bit-map data read/write control circuit 28 connected through a bus B5 to the bit-map memory unit 24 and through a bus B6 to the font memory unit 26. Further provided in the bit-map data processing network 16 is a bit-map control circuit 30 responsive to data from the file buffer circuit 14 through the bus B2 and connected through a bus B7 to the bit-map data read/write control circuit 28. The bit-map data read/write control circuit 28 is operative to read font data from the font memory unit 26 through the bus B6 and load the bit-map character pattern data into the bit-map memory unit 24 through the bus B5. The bit-map control circuit 30 is responsive to data from the file buffer circuit 14 through the bus B2. Upon receipt of the data from the file buffer circuit 14 through the bus B2, the bit-map control circuit 30 outputs intermediate code signals, on the basis of which the bit-map memory unit 24 is accessed at any addresses thereof and/or the font memory unit 26 is accessed at any addresses thereof through the bit-map read-write control circuit 28 and by way of the buses B5 and B6, respectively, as will be described in more detail. The bit-map control circuit 30 is also connected through a bus B8 to the font memory unit 26 as shown.

On the other hand, the print engine control network 18 comprises various control circuits which are shown including an interface control circuit 32, and a print head control circuit 34. The interface control circuit 32 processes the data received from the bit-map control circuit 30 through the control data bus B3 and controls the selective activation of the indicators and display window on the control panel (not shown) which form part of the apparatus embodying the present invention. The interface control circuit 32 is further operative to control the timings at which the various functional units and members incorporated in the print engine module of the apparatus embodying the present invention are to be activated and de-activated.

The print head control circuit 34 is responsive to the data supplied from the bit-map data read/write control circuit 28 through the character pattern data bus B4 and dictates the operation of a print head also incorporated in the print engine module. The print head incorporated in the print engine module of the printer apparatus embodying the present invention is assumed to be of the laser type by way of example and, thus, the print head control circuit 34 herein provided is operative to control the activation of, for example, a semiconductor laser generator and an associated control motor, though not shown in the drawings. The interface control circuit 32 is further connected to the paper supply and sorter control circuits 20 and 22 to control the sheet supply module and the printed output sorter included in the print output module of the print engine module.

Figure 8:
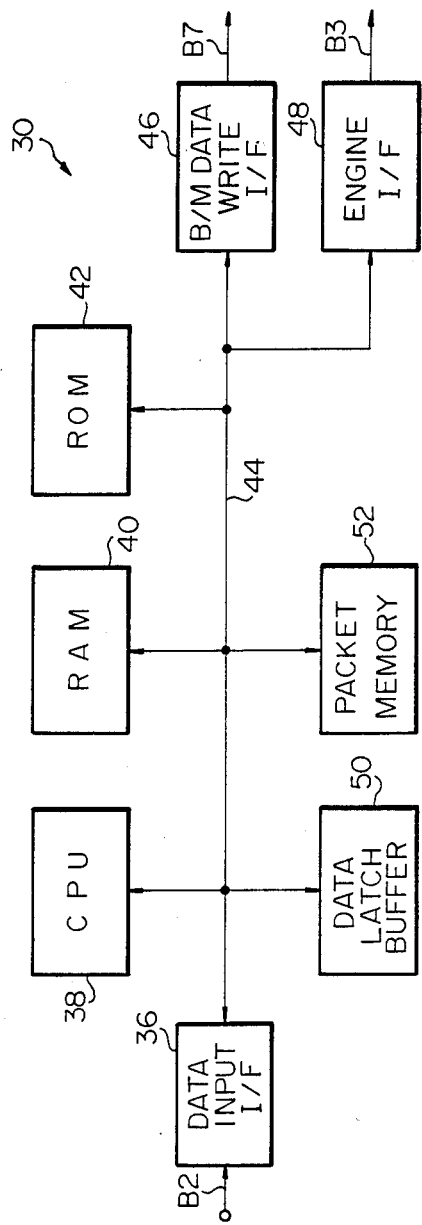
FIG. 8 is a block diagram showing the detailed circuit arrangement of a bit-map control circuit which forms part of the bit-map data processing network illustrated in FIG. 7.

FIG. 8 shows the detailed circuit arrangement of a preferred example of the bit-map control circuit 30 which thus forms part of the bit-map data processing network 16. As shown, the bit-map control circuit 30 comprises a data input interface section 36 connected through the file buffer circuit 14 to the host data processor unit 12 (FIG. 6). The bit-map control circuit 30 further comprises a central processing unit 38, a system RAM unit 40 and a system read-only memory (ROM) unit 42 which are coupled together by a common bus 44 which extends from the data input interface section 36 to output interface sections. The system RAM unit 40 provides a working memory area for the central processing unit 38 and is used for the temporary storage of the contents of the registers in the central processing unit 38 and various basic flags to be used in the central processing unit 38. In the system ROM unit 42 are stored various sets of instructions to be executed by the central processing unit 38.

The output interface sections leading from the common bus 44 include a data write interface section 46 connected to the bit-map data read/write control circuit 28 through the bus B7, and a print engine interface section 48 connected to the interface control circuit 32 of the print engine control network 18 through the control data bus B3. The print engine interface section 48 supplies and receives various pieces of job information including those representative of the number of the printed outputs to be produced and various pieces of job control information to and from the print engine control network 18 through the control data bus B3. The central processing unit 38 may be interrupted periodically by a timer circuit (not shown) which supplies a series of interrupt signals to the central processing unit 38.

The bit-map control circuit 30 shown in FIG. 8 further comprises a data latch buffer register 50 for storing the character pattern data and control data introduced into the bit-map control circuit 30 through the data input interface section 36 of the control circuit 30. The character pattern data and control data thus loaded into the data latch buffer register 50 is then transferred to a packet memory 52 which is implemented by a random-access memory. Before the character pattern data and control data is transferred to the packet memory 52, the data received by the data latch buffer register 50 is re-formulated into packets in the for of function-type intermediate code signals. The data packets thus produced by the data latch buffer register 50 include character pattern data packets each consisting of address data representative of the addresses of any font or alphanumerical character patterns, and control data packets each consisting of data in accordance with which the font or alphanumerical character patterns are to be reproduced. The data re-formulated into such packets is adapted to be readily accepted by the bit-map read/-write control circuit 28 of the bit-map data processing network 16. While the character patterns corresponding to the data read from the bit-map memory unit 24 are being printed, the addresses of the font memory unit 26 from which font data is to be read by the bit-map data read/write control circuit 28 and the addresses of the bit-map memory unit 24 into which character pattern data is to be loaded by the read/write control circuit 28 are calculated from the packet data stored in the packet memory 52. The packet data is loaded into and read from the packet memory 52 on a first-in first-out (FIFO) basis.

Figure 9:
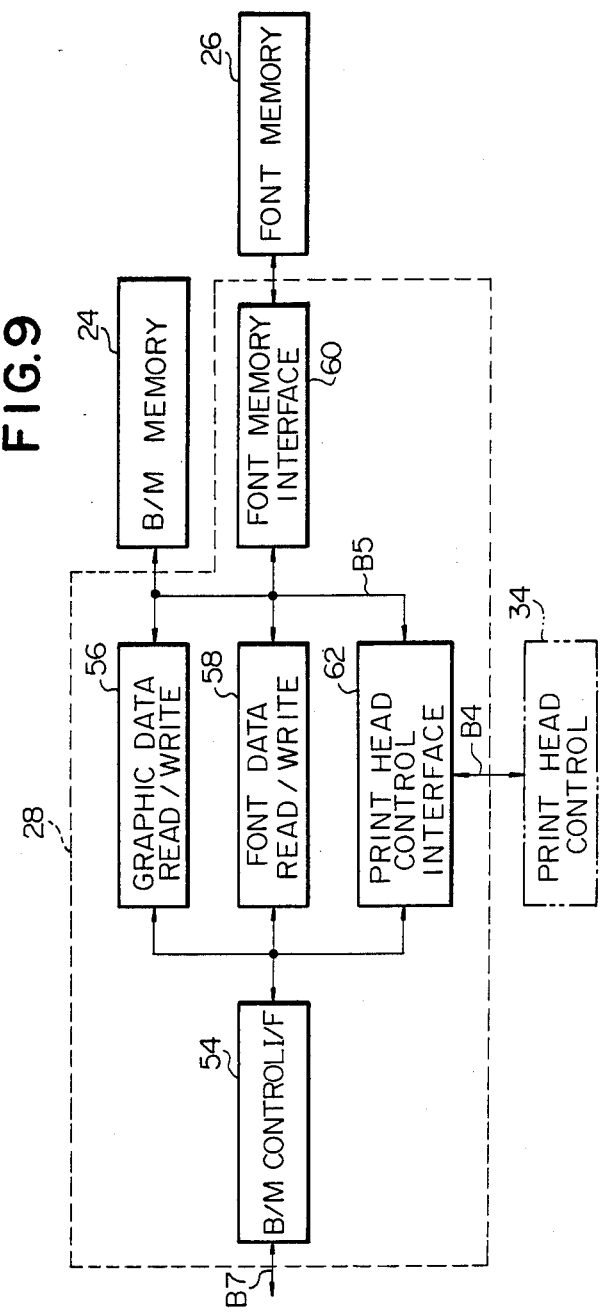
FIG. 9 is a block diagram showing the detailed arrangement of a bit-map data read/write control circuit which also forms part of the bit-map data processing network illustrated in FIG. 7.

FIG. 9 shows an example of the detailed configuration of the bit-map data read/write control circuit 28 which forms part of the bit-map data processing network 16 described with reference to FIG. 7. The major functions of the bit-map data read/write control circuit 28 of the bit-map data processing network 16 include a function to write character pattern data into the bit-map memory unit 24 when such data is loaded into the apparatus 30. The bit-map data read/write control circuit 28 has another function to read data from the bit-map memory unit 24 for transmission to the print engine control network 16 through the bit-map control circuit 30 during printing operation. Thus, the bit-map data read/write control circuit 28 comprises a bit-map control interface circuit 54 connected through the bus B7 to the bit-map control circuit 30 of the bit-map data processing network 18.

Data may be written into or read out of the bit-map memory unit 24 through a graphic image data read/-write control circuit 56 and/or a font data read/write control circuit 58. Each of these graphic image and font data read/write control circuits 56 and 58 is composed of a logic network connected through the bit-map control interface circuit 54 to the bit-map control circuit 30 and operates on intermediate code signals supplied from the bit-map control circuit 30. The graphic image data read/write control circuit 56 is connected between the bit-map control interface circuit 54 and the bit-map memory unit 24 and controls the reading or writing of data representative of graphic features out of or into the bit-map memory unit 24. In controlling the writing of data into the bit-map memory unit 24, the read/write control circuit 56 processes the intermediate code signals received from the bit-map control circuit 30 mostly through analysis into such signals. On the other hand, the font data read/write control circuit 58 is connected between the bit-map control interface circuit 54 and font memory unit 26 through a font memory interface circuit 60 and controls the reading of alphanumerical data out of the font memory unit 26. In response to the intermediate code signals received from the bit-map control circuit 30, the read/write control circuit 58 reads data from the font RAM unit 26 and writes the data into the bit-map memory unit 24 without analyzing the intermediate code signals received from the bit-map control circuit 30.

The data read/write control circuit 28 further comprises a print head control interface circuit 62 operative to read data from the bit-map memory unit 24 under the control of the print head control circuit 34 forming part of the print engine control network 18. The print head control interface circuit 62 is responsive to a print start code signal supplied from the bit-map control circuit 30 through the bit-map control interface circuit 54 and to a synchronizing signal supplied from the print head control circuit 34 through the character pattern data bus B4. In response to such signals from the bit-map and print head control circuits 30 and 34, the print head control interface circuit 62 transmits to the print head control circuit 34 of the print engine control network 18 the data which has been read out from the bit-map memory unit 24.

Figure 10:
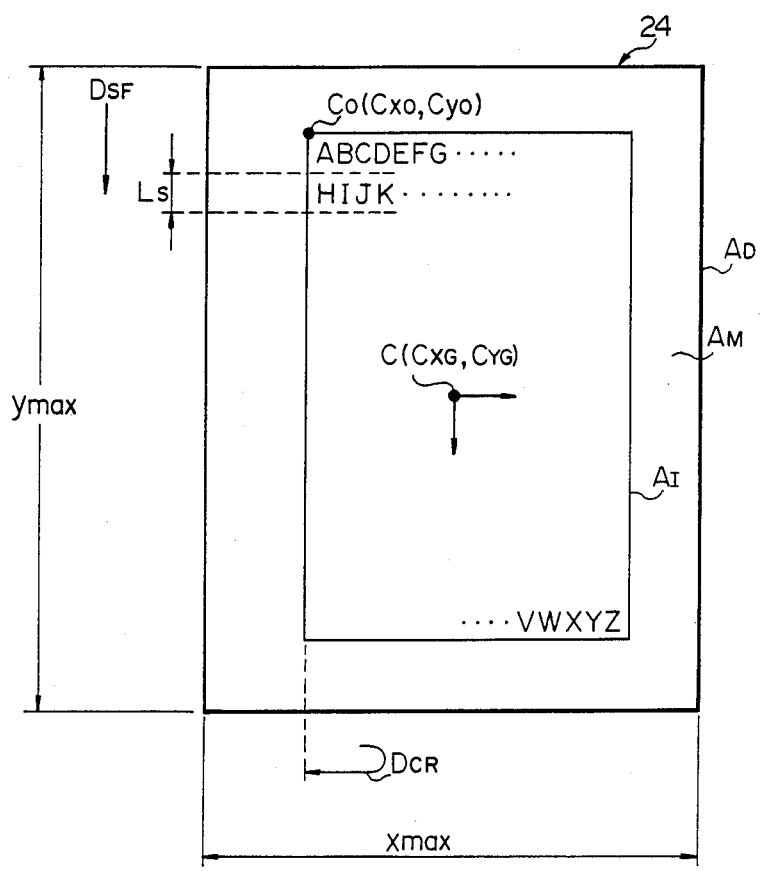
FIG. 10 is a schematic plan view showing the general configuration of a bit-map memory unit further included in the bit-map data processing network of the control system illustrated in FIG. 6.

FIG. 10 shows the general configuration of the bit-map memory unit 24 included in the bit-map data processing network 16 of the control system 10 of the printer apparatus embodying the present invention.

Referring to FIG. 10, the bit-map memory unit 24 has a data storage area $A_D$ corresponding to the total area of a print sheet on which the character pattern data read from the storage area $A_D$ is to be reproduced. The data storage area $A_D$ consists of a character pattern data zone $A_I$ which corresponds to that area of the print sheet within which the character patterns are to be printed and a marginal zone $A_M$ surrounding the character pattern data zone $A_I$ and corresponding to that area, viz., the margin area of the print sheet which is to be left blank. A series of character patterns is to be printed along a line on the print sheet from the data read from the addresses successively accessed from the left end toward the right end of the character pattern data zone $A_I$ as indicated by arrow $D_{LS}$ for each of the lines. The lines each composed of the series of character patterns are to be renewed from the upper end of the zone $A_I$ downward as indicated by arrow $D_{SF}$ with a predetermined line spacing $L_S$ formed by a carriage return $D_{CR}$ for new line. A cursor C indicative of any particular location of the area within which a character pattern is to be printed is movable within that area of the display screen which corresponds to the character pattern data zone $A_I$. Such a cursor C has x-axis and y-axis coordinates $C_{XG}$ and $C_{YG}$ in the original $X_G$-$Y_G$ coordinate system and an origin $C_o(C_{xo}, C_{yo})$ at the left, upper corner of the zone $A_I$ and is to be moved from the left end toward the right end of the zone $A_I$ and from the upper end toward the lower end of the character pattern data zone $A_I$ as a standard direction. The direction of movement of the cursor C is given in terms of the angle through which the direction of movement of the cursor makes counter-clockwise from the standard direction in which character patterns are to be reproduced along a line on the display screen.

Description will now be made regarding the modes of operation of the printer apparatus to carry out a method according to the present invention including the control system constructed and arranged as hereinbefore described.

Main Routine Program

Figure 11A:
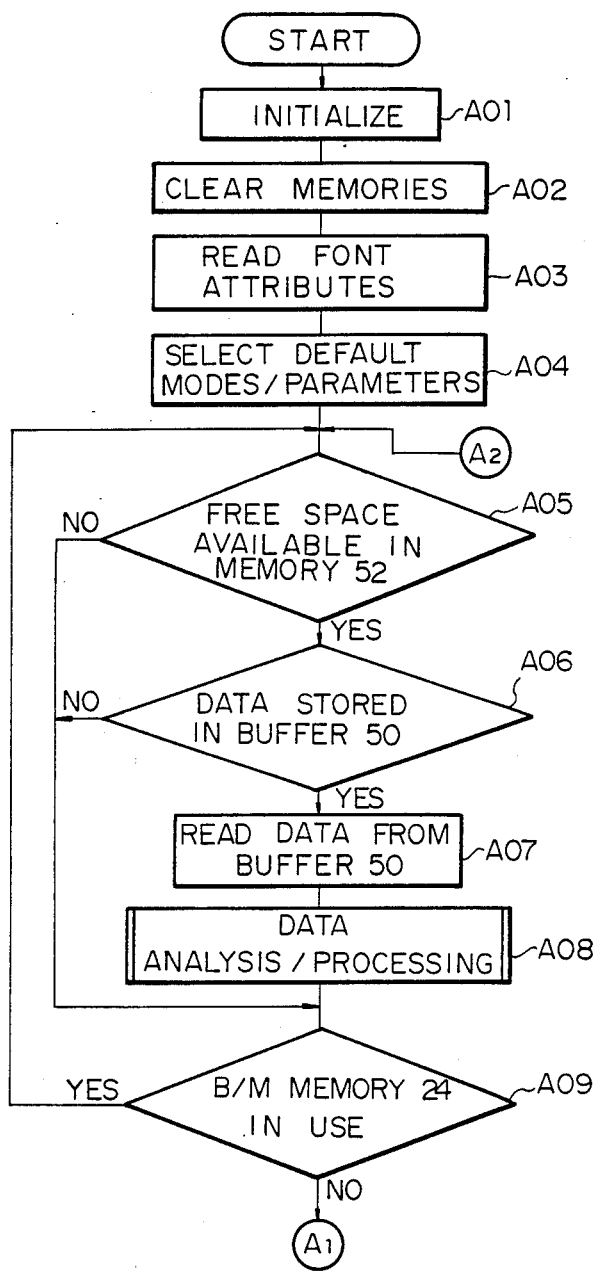
FIGS. 11A, 11B and 11C is a flowchart showing the main routine program in accordance with which the bit-map control circuit which forms part of the bit-map data processing network shown in FIG. 7 is to operate under the control of the central processing unit included in the bit-map control circuit.
Figure 11B:
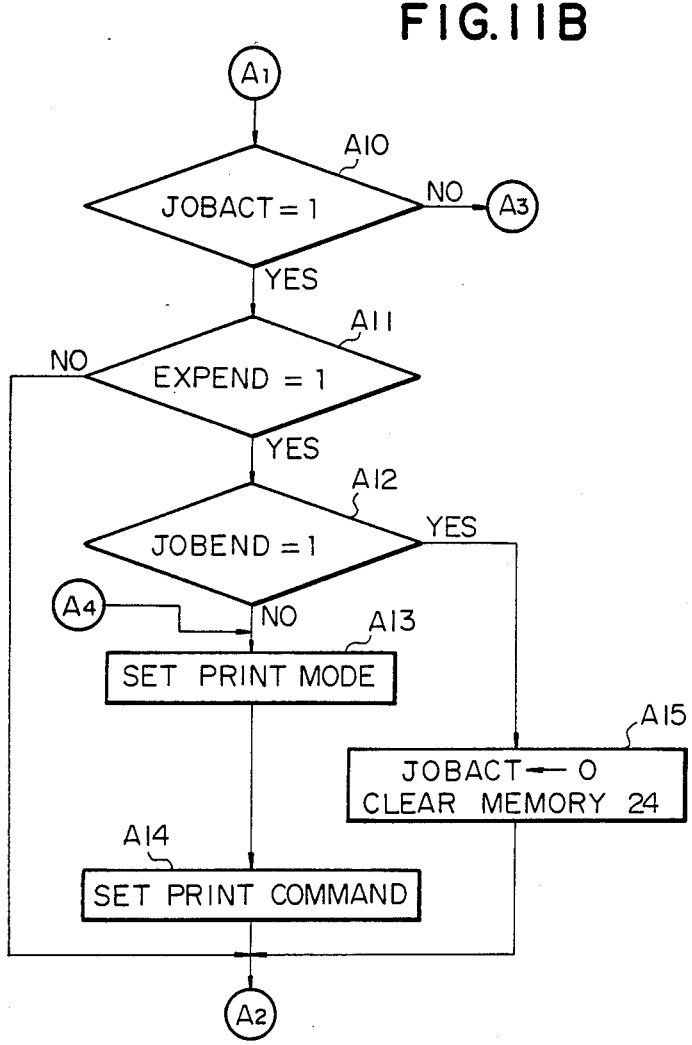
Figure 11C:
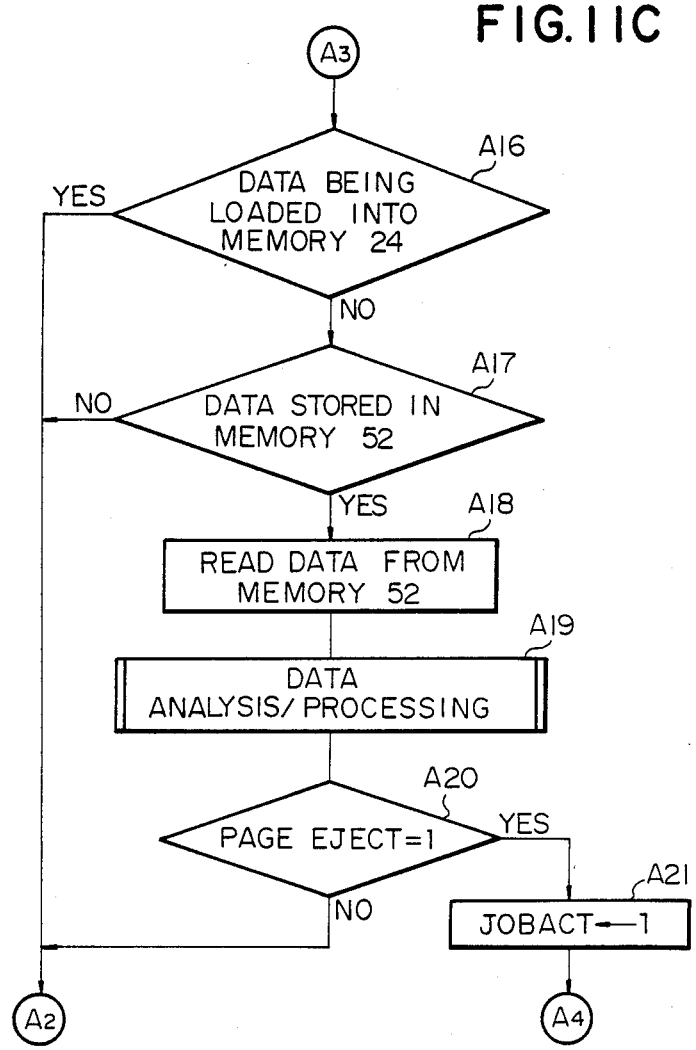

FIGS. 11A, 11B and 11C show the main routine program in accordance with which the bit-map control circuit 30 forming part of the data processing network 16 is to operate responsive to data from the file buffer circuit 14 through the bus B2 and data from the bit-map data read/write control circuit 28. This main routine program is executed under the control of the central processing unit 38 of the bit-map control circuit 30.

In the main routine program are used job control flags representative of various operational parameters and conditions dictated by the central processing unit 38. Such job control flags include flags "JOBACT", "JOBEND" and "EXPEND".

Of these job control flags, the job control flag "JOBACT" when having a logic "1" state indicates that a job is still in progress for the printing of a print sheet or typically that printing operation for producing a specified number of printed outputs for a given page of original character pattern information is still incomplete. In the presence of the job control flag "JOBACT" of logic "1" state, it is thus determined that a request for producing a specified number of printed outputs for a given page of original character pattern information has not been fulfilled and that the printer 30 is required to proceed with the printing operation for the currently given page of character pattern information. The job control flag "JOBEND" when having a logic "1" state indicates that the printing operation for a given page of original character pattern information is terminated with a single printed output or the specified number of printed outputs produced. The job control flag "EXPEND" when having a logic "1" state indicates that the optical scanning of the currently given page of original character pattern information is complete. This flag "EXPEND" is used to enable the print engine module to operate in synchronism with the interface control circuit 32 and is thus effective only when printing operation is in progress.

Furthermore, the data which may be supplied from the data processor unit 12 to the bit-map control circuit 30 through the file buffer circuit 14 and by way of the buses B1 and B2 include coded interface control or IFC signals to passed to the interface control circuit 32 through the bus B3, coded job control signals, coded format control signals, and coded character pattern signals. The job control signals include a signal "JOB START" used for the grouping of pages and a signal "PAGE EJECT" which when having a logic "1" state is indicative of the termination of the storage of character pattern data into the bit-map memory unit 24 and is used for the pagination of printed outputs. The data including these coded job control signals are stored through the data interface section 36 and bus 44 into the packet memory 52. The format control signals include a signal specifying the number of the printed outputs to be produced for a page of original character pattern information and a signal indicating the sheet storage cassette to be selected for use.

Referring first to FIG. 11A, the main routine program is executed under the control of the central processing unit 38 included in the bit-map control circuit 30 illustrated in FIG. 7. The routine program starts with a step A01 to initialize the central processing unit 38 when the printer apparatus embodying the present invention is switched in. The job control flags and signals such as the flags "JOBACT", "JOBEND" and "EXPEND" and signals "JOB START" and "PAGE EJECT" as above mentioned are initialized each to logic "0" state at this step A01. The step A01 is followed by step A02 to initialize all the memories, buffers and registers At this step A02 are also initialized the bit-map memory unit 24, data latch buffer register 50 and packet memory 52 (FIG. 8) so that the content of each of these memory unit 24, buffer register 50 and memory 52 is cleared.

The main routine program then proceeds to step A03 to read the data representative of the attributes of the font data stored in the font memory unit 26 of the bit-map data processing network 16. Subsequently to step A03, various parameters and modes of operation of the apparatus are selected and stored as initial control data in accordance with default rules as well as the instructions keyed in through the control panel. Such parameters and modes of operation may include the resolution to which the image is to be reproduced, the protocol conversion table to be put to use, the input-output interface standard such as the RS-232-C (CCITT Recommendation V.24) or Centronics interface standard to be used, the type of the font, and the margin width.

When all the procedures by the steps A01 to A04 are complete, the main routine program proceeds to a decision step A05 to examine whether or not there is a free space in the packet memory 52 of the bit-map control circuit 30. If it is found that there is a free space in the packet memory 52, it is further tested at step A06 whether or not there is any data stored in the data latch buffer register 50 of the bit-map control circuit 30. When it is determined at this step A06 that there is any data stored in the data latch buffer register 50, the step A06 is followed by step A07 to read the data from the data latch buffer register 50 and further by a data analysis/processing subroutine program A08 to analyze and process the data thus read from the data latch buffer register 50. The details of this data analysis/processing subroutine program A08 will be hereinafter described with reference to FIG. 12.

Upon termination of the data analysis/processing subroutine program A08 or when the answer for the step A05 or step A06 is given in the negative, the main routine program proceeds to step A09 to check if the bit-map memory unit 24 is currently in use for printing operation. If it is found that the bit-map memory unit 24 is in use for printing operation and is not accessible, the loop of the steps A05 to A09 is repeated until the answer for the decision step A09 turns affirmative. When the answer for the step A09 is thus given in the affirmative with the bit-map memory unit 24 in a state allowing access thereto, the routine program proceeds through a connector $A_1$ to step A10 illustrated in FIG. 11B.

At step A10 is queried whether or not there are two or more printed outputs left to be produced during the current printing operation. This decision is made through detection of the job control flag "JOBACT" of logic "1" state. If the answer for the step A10 is given in the affirmative with the job control flag "JOBACT" found to be of logic "1" state, it is further checked at step A11 whether or not the job control flag "EXPEND" is of a logic "1" state indicating that the optical scanning of the currently given page of original character pattern information is complete. In the presence of the flag "EXPEND" of the logic "1" state, it is tested at step A12 whether or not the job control flag "JOBEND" has a logic "1" state indicating that the printing operation for a given page of original character pattern information is terminated with a single printed output or the specified number of printed outputs produced. If the answer for this step A12 is given in the negative, the print engine module of the apparatus is actuated to operate with the interface control circuit 32 enabled by a print mode signal at step A13 and activated by a print command signal at step A14. If it is determined at step A12 that the job control flag "JOBEND" has a logic "1" state indicating that the printing operation for a given page of original character pattern information has been terminated, the job control flag "JOBACT" is reset to a logic "0" state and the content of the bit-map memory unit 24 is cleared at step A15.

Subsequently to the step A14 or step A15 or when it is found at the step A11 that the job control flag "EXPEND" is of a logic "0" state indicating that the optical scanning of the currently given page of original character pattern information is still incomplete, the main routine program reverts to step A05 through a connector $A_2$ and repeats the loop of the steps A05 to A15 until it is determined at the step A10 that the job control flag "JOBACT" is of a logic "0" state indicating that there are no more printed outputs left to be produced during the current printing operation. When the flag "JOBACT" is thus found to be of the logic "0" state, the step A10 is then followed through a connector $A_3$ to step A16 shown in FIG. 11C.

At this step A16 is confirmed whether or not data is being loaded into the bit-map memory unit 24 with the bit-map read/write control circuit 28 of the bit-map data processing network 16 held inoperative. If the answer for the step A16 is given in the negative, it is further checked at a subsequent step A17 whether or not there is data stored in the packet memory 52 of the bit-map control circuit 30. When it is determined at this step A17 that there is any data stored in the packet memory 52, the step A17 is followed by step A18 to read the data from the packet memory 52 and further by a data analysis/processing subroutine program A19 to analyze and process the data thus read from the packet memory 52. If the data read from the packet memory 52 consists of character pattern data, the data is transferred from the bit-map control circuit 30 to the bit-map data read/write control circuit 28 by way of the bus B7 and, if the data consists of interface control (IFC) data, then the data is transferred from the bit-map control circuit 30 to the interface control circuit 32 of the print engine control network 18 by way of the bus B3. Upon termination of the data analysis/processing subroutine program A19, it is tested at step A20 whether or not the coded job control signal "PAGE EJECT" is of a logic "1" state indicating the termination of the storage of character pattern data into the bit-map memory unit 24.

If it is found at this step A20 that the job control signal "PAGE EJECT" is of logic "1", the step A20 is followed by a step A21 to set the job control flag "JOBACT" followed by a step A21 to set the job control flag "JOBACT" to the logic "1" state and thereupon the main routine program reverts to the step A13 through a connector $A_4$ to repeat the steps A13 and A14 and repeat the loop of the steps A05 to A15 to perform printing operation until the answer for the step A10 turns negative. If it is found at the step A20 that the job control signal "PAGE EJECT" is of a logic "0", the main routine program reverts to step A05 through the connector $A_2$ to repeat the loop of the steps A05 to A10 and A16 to A20. The main routine program also reverts to step A05 when the answer for the step A16 is given in the affirmative with the bit-map data read/write control circuit 28 found to be in operation or the answer for the step A17 is given in the negative with no data found stored in the packet memory 52.

Data Analysis/Processing Subroutine (A08)

Figure 12A:
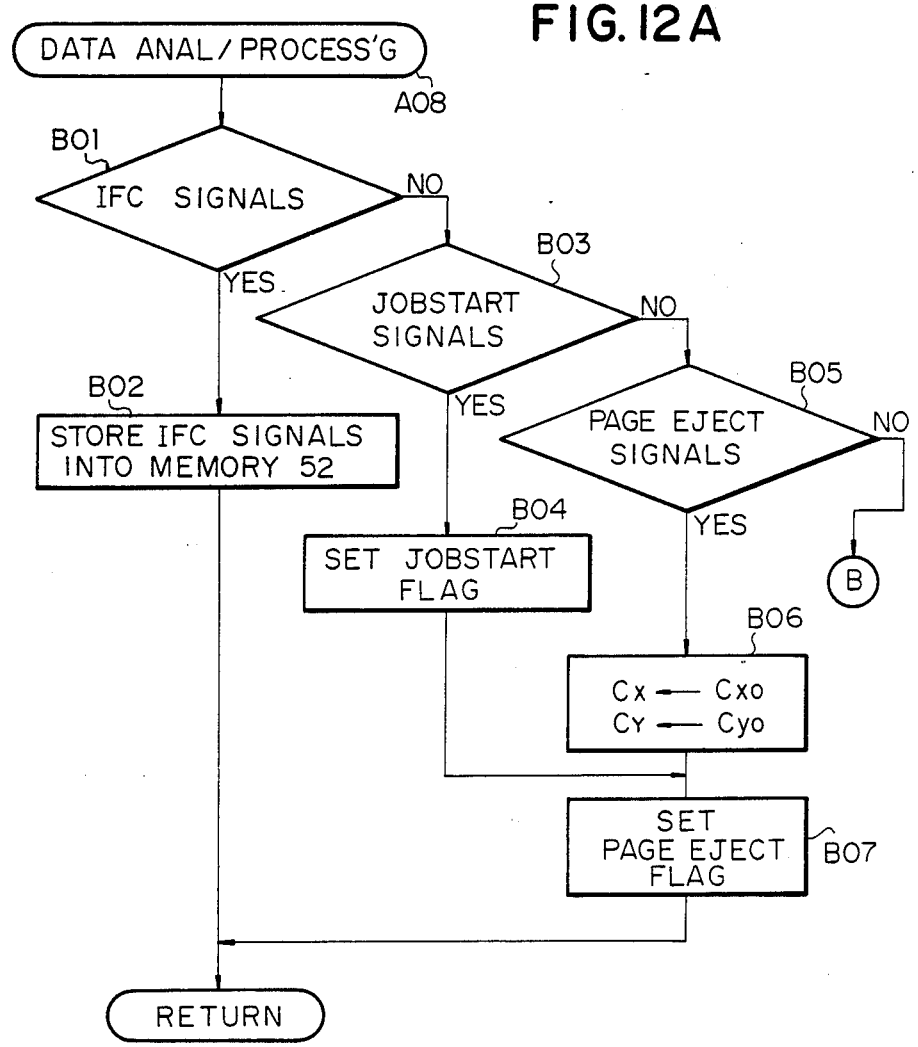

FIGS. 12A and 12B show the details of the data analysis/processing subroutine program A08 included in the main routine program hereinbefore described with reference to FIGS. 11A, 11B and 11C.

The data analysis/processing subroutine A08 starts with a step B01 at which is queried whether or not the data supplied from the data processor unit 12 to the bit-map control circuit 30 includes the coded interface control or IFC signals which are to be processed by the interface control circuit 32. If the answer for this step B01 is control circuit 32. If the answer for this step B01 is given in the affirmative, the step B01 is followed by a step B02 at which the data including such coded IFC signals is transferred to and stored into the packet memory 52 through the data input interface section 36 and bus 44. If it is found at the step B02 that there is no IFC data in the currently analyzed, then the step B01 is followed by step B03 at which it is tested whether or not the data from the data processor unit 12 contains the coded job control signal "JOB START" of logic "1" state. The job control signal "JOB START" is to be used for the grouping of pages and, if it is found at this step B03 that the data supplied from the data processor unit 12 includes such a signal, a flag corresponding to the signal "JOB START" of the logic "1" state is set and stored into the packet memory 52 at step B04.

If it is found at the step B03 that the control data received from the data processor unit 12 includes data other than the IFC signals and job control signal "JOB START", then it is tested at step B05 whether or not the data from the data processor unit 12 includes the job control signal "PAGE EJECT" of logic "1" state which is indicative of the termination of the storage of character pattern data into the bit-map memory unit 24 and which is thus used for the pagination of printed outputs. If it is found at the step B05 that the signal "PAGE EJECT" of logic "1" state is contained in the data received, it is determined that the storage of the character pattern data into the RAM unit 24 is complete so that the step B05 is followed by a step B06 which the x-axis and y-axis coordinates $C_{XG}$ and $C_{YG}$ of the cursor C in the character pattern data zone $A_I$ (FIG. 10) of the bit-map memory unit 24 are renewed to its home position at the origin ($C_{xo}$, $C_{yo}$), is to be moved under standard conditions from the left end toward the right end and from the upper end toward the lower end of the character pattern data zone $A_I$. Subsequently to the step B04 or Step B06, a flag corresponding to the signal "PAGE EJECT" of the logic "1" state is set and stored into the packet memory 52 at step B07.

If it is found at the step B05 that the job control signal "PAGE EJECT" of logic "1" state is not contained in the control data received from the data processor unit 12, then it is tested at step B08 whether or not the data received from the data processor unit 12 includes the format control signals to dictate the format in accordance with which the character patterns are to be printed. As noted previously, such format control signals include a signal dictating the number of the printed outputs to be produced for a page of original character pattern information and a signal indicating the sheet storage cassette to be selected for the supply of print sheets. If the answer for this step B08 is given in the affirmative, the step B08 is followed by a format control subroutine program B09 at which the addresses of the data to be stored into the bit-map memory unit 24 are updated. The details of this format control subroutine program B09 will be hereinafter described with reference to FIG. 17.

Of the signals representing the data received from the data processor unit 12, those other than the IFC data, signals such as the signals "JOB START" and "PAGE EJECT" signals and format control signals are regarded as character pattern signals. When the answer for the step B08 is given in the negative, it is thus questioned at step B10 if the data received contains a character pattern formation control signal appearing at the beginning of a page. If the answer for this step B10 is given in the affirmative, the image zone $A_I$ in the bit-map memory unit 24 is defined by an image zone defining subroutine program B11 in accordance with the particular character pattern formation control signal. The details of this image zone defining subroutine program B11 will be hereinafter described with reference to FIGS. 14 and 15.

Upon termination of the subroutine program B11 or when it is found at the step B10 that the data received contains no character pattern formation control signal to appear at the beginning of a page, the character pattern signals received are formulated into intermediate coded signals for storage into the packet memory 52. Each of these intermediate coded signals includes addresses to be accessed in the font memory unit 26, addresses at which the character pattern data are to be loaded into the bit-map memory unit 24, and the mode in which character pattern data are to be stored into the memory unit 24. The addresses to be accessed in the font memory unit 26 are stored into the packet memory 52 at step B12. The addresses at which the character pattern data are to be loaded into the bit-map memory unit 24 are processed and transformed into signals defined on the absolute X-Y coordinate system through an address calculation subroutine program B13 and the resultant addresses are stored into the packet memory 52 at step B14. These addresses include those which are located at the left lower ends of the areas within which the character patterns represented by the character pattern data are to be respectively stored into the bit-map memory unit 24, such as the location represented by the coordinate point $P(X_{Gi}, Y_{Gi})$ in FIGS. 4 and 5. The details of the address calculation subroutine program B13 will be hereinafter described with reference to FIG. 16. On the other hand, the mode in which character pattern data are to be stored into the memory unit 24 includes a parameter indicating the direction in which character patterns are to be printed along each line and is stored into the packet memory 52 at step B15. The step B15 may be followed by a step B16 to update the x-axis coordinate $C_{XG}$ of the cursor C (FIG. 10) so that the addresses at which data are to be loaded into the bit-map memory unit 24 during the subsequent write cycle are modified depending on the size of the character patterns of the font to be used during the subsequent write cycle.

Data Load Interrupt Subroutine

Figure 13:
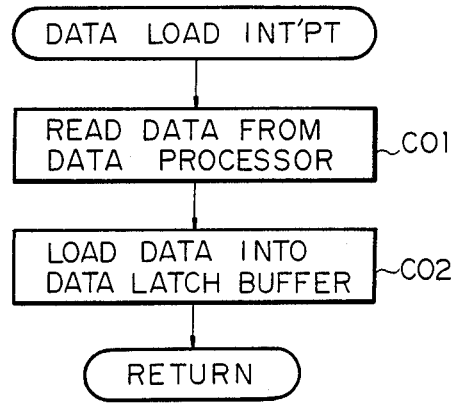
FIG. 13 is a flowchart showing the details of a data load interrupt subroutine program included in the main routine program illustrated in FIGS. 11A, 11B and 11C.

FIG. 13 shows the data load interrupt subroutine program which is to be executed to control the loading of data through the data input interface section 36 into the data latch buffer register 50 of the system RAM unit 40 (FIG. 8). The data load interrupt subroutine program includes a step C01 at which data is supplied from the host data processor unit 12. At a subsequent step C02, the data thus supplied from the host data processor unit 12 is transferred through the data input interface section 36 to the data latch buffer register 50. The data is then reformulated into packets and the resultant packet data is transferred to the packet memory 52 for further transfer to the bit-map data read-write control circuit 28.

Image Zone Defining Subroutine (B11)

Figure 14:
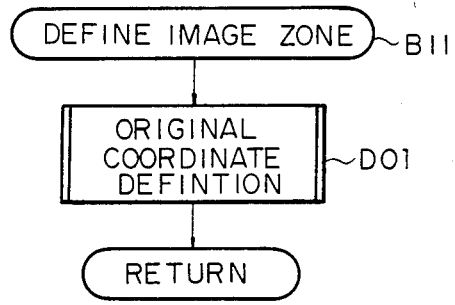
FIG. 14 is a flowchart showing the details of an image zone defining subroutine program included in the data analysis/processing subroutine program illustrated in FIGS. 12A and 12B.

FIG. 14 shows the image zone defining subroutine program B11 included in the data analysis/processing subroutine program described with reference to FIGS. 12A and 12B. This image zone defining subroutine program B11 includes an original coordinate system defining subroutine program D01 by which one of the shorter and longer measurements W and L of the print sheet is set as the value $x_{max}$ and the other set as the value $y_{max}$ to initially produce a parameter "MCB-ORI" indicating the direction of printing in which character patterns are to be printed along a line on a print sheet. The parameter "MCB-ORI" is given in terms of an angular shift from a predetermined direction of printing. The details of this original coordinate system defining subroutine program D01 will be hereinafter described with reference to FIG. 15.

Original Coordinate Definition Subroutine (D01)

Figure 15:
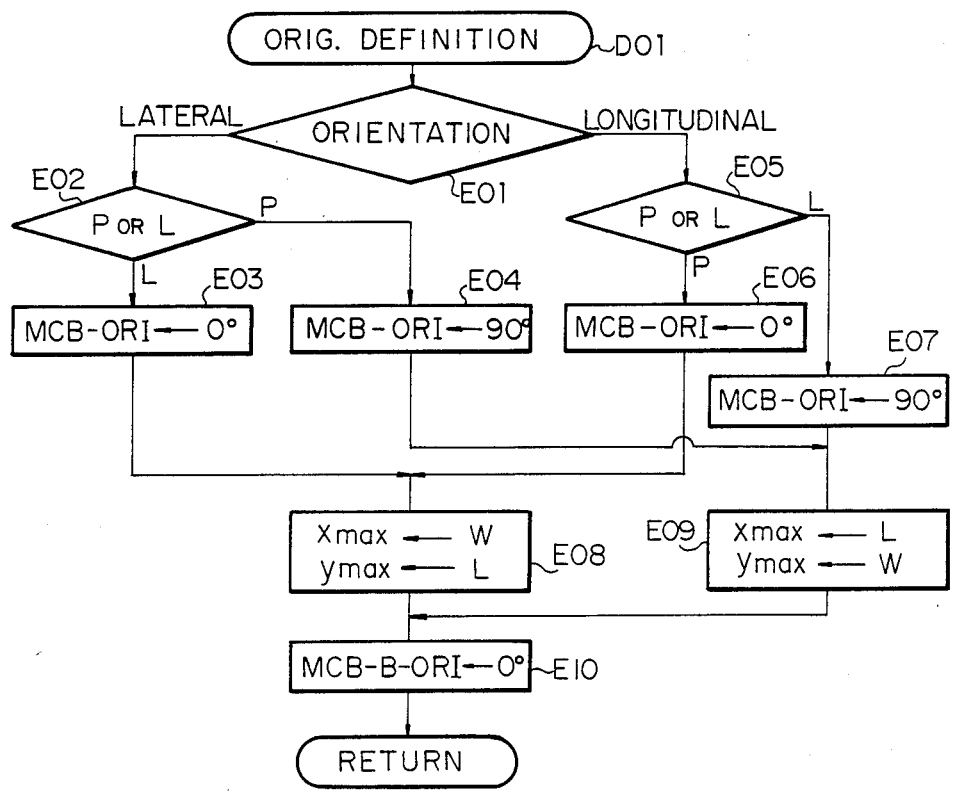
FIG. 15 is a flowchart showing the details of an original coordinate system defining subroutine program included in the image zone defining subroutine program illustrated in FIG. 14.

FIG. 15 shows the details of the original coordinate system defining subroutine program D01 included in the image zone defining subroutine program hereinbefore described with reference to FIG. 14. The image zone defining subroutine program B11 is included in the data analysis/processing subroutine program A08 described with reference to FIGS. 12A and 12B and is executed when it is found at the step B10 that the data received contains a character pattern formation control signal to appear at the beginning of a page. In this original coordinate system defining subroutine program D01 is used a status signal "MCB-ORI" which specifies the angle of shift $\theta$ of the direction of printing $D_{LS}$ for transformation from the temporary $X_T$-$Y_T$ coordinate system into the absolute X-Y coordinate system. Such a status signal "MCB-ORI" is composed of a status signal "MCB-B-ORI" indicative of the direction of printing in which character patterns are to be printed along a line and a signal representative of the status of transformation between the original $X_G$-$Y_G$ coordinate system and the absolute X-Y coordinate system defined when the original coordinate system is defined. The direction $D_{LS}$ of printing indicated by the status signal "MCB-B-ORI" is defined in terms of the angle through which the direction of printing makes counterclockwise from the standard direction in which character patterns are to be printed on the print sheet.

The original coordinate system defining subroutine program D01 starts with a step E01 to determine if the print sheet $S_P$ is to be oriented for lateral feed with its shorter measurement W in the direction $D_{PS}$ of travel of the print sheet $S_P$ as shown in FIG. 2A or for longitudinal feed with its longer measurement L in the direction $D_{PS}$ of travel of the print sheet $S_P$ as shown in FIG. 2B.

If it is found at the step E01 that the print sheet is to be oriented for lateral feed, it is confirmed at step E02 whether the portrait mode (P) cf printing or the landscape mode (L) of printing is currently selected. If it is determined that the landscape mode of printing is currently selected, the step E02 is followed by step E03 at which the status signal "MCB-ORI" is set at zero degrees. If it is determined at the step B02 that the portrait mode of printing is currently selected, then the step E02 is followed by step E04 at which the status signal "MCB-ORI" is set at 90 degrees.

If it is found at the step E01 that the print sheet is to be oriented for longitudinal feed, it is also confirmed at step E05 whether the portrait mode of printing or the landscape mode of printing is currently selected. If it is determined that the portrait mode of printing is currently selected, the step E05 is followed by step E06 at which the status signal "MCB-ORI" is set at zero degrees. If it is determined at the step B06 that the landscape mode of printing is currently selected, then the step E05 is followed by step E07 at which the status signal "MCB-ORI" is set at 90 degrees.

The status signal "MCB-ORI" being set at zero degrees when the landscape mode of printing is selected with the print sheet oriented for lateral feed (E02/E03) or when the portrait mode of printing is selected with the print sheet oriented for longitudinal feed (E05/E06), the temporary $X_T$-$Y_T$ coordinate system results in the original $X_G$-$Y_G$ coordinate system shown in FIG. 3A so that the shorter measurement W of the print sheet is set as the value $x_{max}$ and the longer measurement L of the print sheet set as the value $y_{max}$ as at step E08. On the other hand, the status signal "MCB-ORI" being set at 90 degrees when the portrait mode of printing is selected with the print sheet oriented for lateral feed (E02/E04) or when the landscape mode of printing is selected with the print sheet oriented for longitudinal feed (E05/E07), the temporary $X_T$-$Y_T$ coordinate system results in the original $X_G$-$Y_G$ coordinate system shown in FIG. 3B so that the longer measurement L of the print sheet is set as the value $x_{max}$ and the shorter measurement W of the print sheet set as the value $y_{mzx}$ as at step E09. Either the step E08 or the step E09 is followed by step E10 at which the status signal "MCB-B-ORI" is set to represent a default rule value of zero degrees. It may thus be noted that the status signal "MCB-ORI" which is set either at zero degrees or 90 degrees at any of the steps E03, E04, E06 and E07 is, in effect, inclusive of the status signal "MCB-B-ORI" set to represent the zero degrees at the step E10 in addition to the signal representative of the status of transformation between the original $X_G$-$Y_G$ and absolute X-Y coordinate systems.

Data Load Address Calculation Subroutine (B13)

Figure 16:
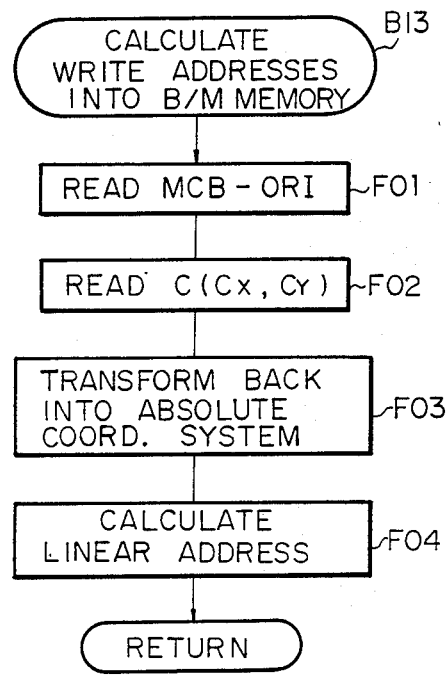
FIG. 16 is a flowchart showing the details of a data load address calculation subroutine program further included in the data analysis/processing subroutine program illustrated in FIGS. 12A and 12B.

FIG. 16 shows the details of the data load address calculation subroutine program B13 further included in the data analysis/processing subroutine program A08 described with reference to FIGS. 12A and 12B. This address calculation subroutine program B13 is executed to calculate the addresses at which character pattern data are to be stored into the bit-map memory unit 24 and starts with a step F01 to read the status signal "MCB-ORI" which specifies the angle of shift θ of the direction of printing for transformation from the temporary $X_T$-$Y_T$ coordinate system into the absolute X-Y coordinate system. The step F01 is followed by a step F02 to read the coordinate location ($C_{XG}$, $C_{YG}$) of the cursor C in the character pattern data zone $A_I$ of the bit-map memory unit 24. Subsequently to this step F02, the coordinate location ($C_{XG}$, $C_{YG}$) of the cursor C is conversely transformed into a coordinate location in the absolute X-Y coordinate system as at step F03, whereupon the linear address of the particular location in the character pattern data zone $A_I$ of the bit-map memory unit 24 is calculated at step F04 by converting the address in the absolute X-Y coordinate system into an address within the character pattern data zone $A_I$.

Thus, the steps F01, F02 and F03 are executed so that a coordinate value representative of a particular location at which the printing of a character pattern is to be started is transformed from one coordinate system into another on the basis of the updated parameter implemented by the status signal "MCB-ORI" such that the coordinate value corresponds to a coordinate value in the coordinate system on the bit-map memory 24. The subsequent step F04 is executed for storing the updated parameter and the transformed coordinate value into a temporary memory implemented by the packet memory 52.

Format Control Subroutine (B09)

FIG. 17 shows the details of the format control subroutine program B09 included in the data analysis/processing subroutine program A08 described with reference to FIGS. 12A and 12B. The items of the format to be controlled by this format control subroutine program B09 typically include the direction in which character patterns are to be formed for the portrait or landscape mode of printing, the direction in which each of the lines of character patterns is to be printed, the location of the cursor C, and the carriage return for new line.

Thus, the format control subroutine program B09 starts with a step G01 at which is queries whether there is specified or not the direction in which character patterns are to be formed for the portrait or landscape mode of printing. Such a direction can be specified when and only when the character pattern data at the beginning of a page is preliminarily received. When it is found at the step G01 that there is specified the direction in which character patterns are to be formed, it is tested at step G02 if the data received contains a character pattern formation control signal appearing at the beginning of a page. If the answer for this step G02 is given in the affirmative, it is determined whether the portrait mode of printing or the landscape mode of printing is selected. If it is found at this step G03 that the portrait mode of printing is selected, a portrait/landscape mode (P/L) flag indicating the portrait mode is set at step G04. If it is found at the step G03 that the landscape mode of printing is selected, then a portrait/landscape mode flag indicative of the landscape mode is set at step G05.

If it is found at the step G01 there is not specified the direction in which character patterns are to be formed, it is tested at step G06 if there is specified or not the direction in which each of the lines of character patterns is to be printed. If the answer for this step G06 is given in the affirmative, a temporary coordinate system defining subroutine program G07 is executed subsequently to the step G06 to define the temporary $X_T$-$Y_T$ coordinate system when there is a change in the direction in which character patterns are to be printed along a line. The details o this temporary coordinate system defining subroutine program G07 will be hereinafter described with reference to FIG. 18. If it is found at the step G06 there is not specified the direction in which each of the lines of character patterns is to be printed, it is confirmed at step G08 whether there is specified or not the location ($C_{XG}$, $C_{YG}$) of the cursor C within the character pattern data zone $A_I$ of the bit-map memory unit 24. As has been noted, the location ($C_{XG}$, $C_{YG}$) of the cursor C is defined on the original $X_G$-$Y_G$ coordinate system. If it is found at step G08 that the location of the cursor C within the character pattern data zone $A_I$ is specified, then the coordinate location ($C_{XG}$, $C_{YG}$) of the cursor C in the original $X_G$-$Y_G$ coordinate system is converted ed into a location in the temporary $X_T$-$Y_T$ coordinate system as at step G09. The step G09 is followed by a step G10 at which the cursor C is moved to the coordinate location C($C_{XG}$, $C_{YG}$) thus expressed in the temporary $X_T$-$Y_T$ coordinate system. As has been noted, the cursor C is indicative of any particular location of the area within which a character pattern is to be printed.

If it is found at the step G08 that the location of the cursor C within the character pattern data zone $A_I$ is not specified, then it is checked at step G11 if the carriage return for new line is required. If it is found at this step G11 that there is such a requirement, the step G11 is followed by step G12 at which the y-axis coordinate $C_Y$ of the cursor C in the character pattern data zone $A_I$ of the bit-map memory area 24 is updated by addition of the line spacing $L_S$ (FIG. 10) to the current y-axis coordinate $C_Y$ of the cursor C. If it is found at the step G11 that the carriage return for new line is not required, it is tested at step G13 whether or not there is an instruction to return to the beginning of the current line. If the answer for this step G13 is given in the affirmative, the step G13 is followed by step G12 at which the x-axis coordinate $C_X$ of the cursor C in the character pattern data zone $A_I$ of the bit-map memory area 24 is updated to the value $C_{xo}$ representative of the left end of the character pattern data zone $A_I$.

Figure 18:
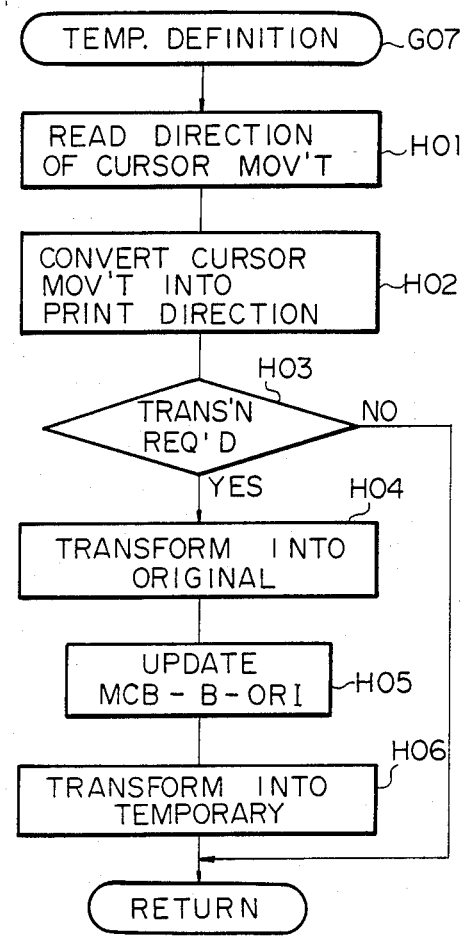
FIG. 18 is a flowchart showing the details of a temporary coordinate system defining subroutine program included in the format control subroutine program illustrated in FIG. 17.

FIG. 18 shows the details of the temporary coordinate system defining subroutine program G07 included in the format control subroutine program B09 hereinbefore described with reference to FIG. 17. The temporary coordinate system defining subroutine program G07 is executed to define the temporary $X_T$-$Y_T$ coordinate system responsive to a change in the direction in which character patterns are to be printed along a line. As has been noted, the temporary $X_T$-$Y_T$ coordinate system defines the orientations of the individual character patterns to be printed for each page in terms of the angular shifts of the character patterns from the standard orientations or attitudes defined in the original $X_G$-$Y_G$ coordinate system and is defined by the protocol incorporated in the host data processor unit 12.

The temporary coordinate system defining subroutine program G07 starts with a step H01 to read from the data receiived from the data processor unit 12 the data indicating the direction of movement of the cursor C, viz., the angle of counter-clockwise turn of the direction of movement of the cursor C from the standard direction in which character patterns are to be indicated on the display screen. The step H01 is followed by step H02 at which the data thus indicating the direction of movement of the cursor C is then converted into the status signal "MCB-B-ORI" indicative of the direction of printing in which character patterns are to be printed along a line.

It is then tested at step H03 whether or not the resultant status signal "MCB-B-ORI" requires transformation of the coordinate system or, in other words, the direction f printing indicated by the resultant status signal "MCB-B-ORI" is identical with the currently valid direction of printing. If the answer for this step H03 is given in the negative, the subroutine program reverts to the main routine program illustrated in FIGS. 11A to 11C. The steps H01, H02 and H03 are thus executed for analyzing the information received from an external source implemented by the data processor unit 12 to determine whether or not the direction of printing designated by the information received is identical with the direction of printing indicated by the parameter "MCB-ORI" produced by the subroutin program D01 described with reference to FIG. 15.

If the answer for the step H03 is given in the affirmative, each of the status signals "MCB-ORI" and "MCM-B-ORI" is updated through steps H04 to H06. For this purpose, data are conversely transformed from the temporary $X_T$-$Y_T$ coordinate system into the original $X_G$-$Y_G$ coordinate system at step H04 through the offset angle represented by the status signal "MCB-B-ORI" in the current temporary $X_T$-$Y_T$ coordinate system and thereafter the resultant status signal "MCB-B-ORI" is updated at step H05, followed by transformation of the status signal back into the temporary $X_T$-$Y_T$ coordinate system to update the status signal "MCB-ORI" at step H06. Thus, the steps H04, H05 and H06 are executed for the purpose of updating the parameter implemented by the status signal "MCB-ORI" if the direction of printing designated by the information received from the data processor unit 12 is not identical with the direction of printing indicated by the parameter. At the step H06 are also updated the values $x_{max}$ and $y_{max}$ set at step E08 or step E09 in he original coordinate system defining subroutine program D01 described with reference to FIG. 15.

As will have been understood from the foregoing description, the location of the cursor C is updated through execution of the step G12 or step G14 in the format control subroutine program B09 without respect to the original $X_G$-$Y_G$ coordinate system as viewed by the operator when character pattern data are to be stored into the bit-map memory unit 24. The location of the cursor C thus updated is automatically transformed to a location in the original $X_G$-$Y_G$ coordinate system when the addresses at which data are to be stored into the memory unit 24 are to be calculated through execution of the steps F01 to F04 of the subroutine program B13 in the data analysis/processing subroutine program A08. This facilitates the operator of the apparatus to produce a print having character patterns printed along a line in a direction different from the standard direction of printing in the original $X_G$-$Y_G$ coordinate system. In this instance, any coordinate system may be defined on the basis of the original $X_G$-$Y_G$ coordinate system so that the operator of the apparatus will be further enabled to correctly picturize the coordinate system to be defined and to readily define the desired coordinate system.

What is claimed is:

1. In a printer apparatus wherein information relating to character patterns to be printed is received from an external source and is analyzed and converted into intermediate coded data, which are stored into a temporary memory and are thereafter successively read from the temporary memory to produce bit-map image data representative of the character patterns to be printed for each page of printed output, whereupon the bit-map image data is stored into a bit-map memory by referring to a font memory and the character patterns are printed on the basis of the bit-map image data read from the bit-map memory for each page of printed output, a method of converting said information into said intermediate coded data and storing the intermediate coded data into said temporary memory, comprising (a) a step of initially producing a parameter indicating the direction of printing in which character patterns are to be printed along a line, said parameter being given in terms of an angular shift from a predetermined direction of printing, (b) a step of analyzing said information received from said external source to determine whether or not the direction of printing designated by said information is identical with the direction of printing indicated by said parameter, (c) a step of updating said parameter if the direction of printing designated by said information is not identical with the direction of printing indicated by the previously set parameter, (d) a step through which a coordinate value representative of a particular location at which the printing of a character pattern is to be started is transformed from one coordinate system into another on the basis of the updated parameter such that said coordinate value corresponds to a coordinate value in the coordinate system on said bit-map memory, and (e) a step of storing the updated parameter and the transformed coordinate value into said temporary memory, (f) said steps (b), (c) and (d) being executed in respect to the information relating to each of said character patterns whereby the intermediate coded data for all of said character patterns are stored into said temporary memory to store the bit-map image data for each of the character patterns into said bit-map memory 2. A method as set forth in claim 1, in which said initial parameter is produced by (a-1) a step of analyzing data relating to the orientations in any of which a print sheet may be fed in said printer apparatus and data relating to a standard direction in which character patterns are to be printed along a line, and (a-2) a step of determining the initial direction of printing in which character patterns are to be printed along a line and thereafter producing said parameter indicating the initial direction of printing.

* * * * *